US010793741B2

(12) United States Patent
Arita

(10) Patent No.: US 10,793,741 B2
(45) Date of Patent: Oct. 6, 2020

(54) ORGANIC-INORGANIC COMPOSITE PARTICLES, DISPERSION AND RESIN COMPOSITION COMPRISING THE SAME, AND METHOD FOR PRODUCING ORGANIC-INORGANIC COMPOSITE PARTICLES

(71) Applicant: TOHOKU UNIVERSITY, Sendai-shi, Miyagi (JP)

(72) Inventor: Toshihiko Arita, Sendai (JP)

(73) Assignee: TOHOKU UNIVERSITY, Sendai-shi (JP)

( * ) Notice: Subject to any disclaimer, the term of this patent is extended or adjusted under 35 U.S.C. 154(b) by 224 days.

(21) Appl. No.: 15/971,495

(22) Filed: May 4, 2018

(65) Prior Publication Data

US 2018/0258311 A1    Sep. 13, 2018

Related U.S. Application Data

(62) Division of application No. 14/420,802, filed as application No. PCT/JP2013/071725 on Aug. 9, 2013, now abandoned.

(30) Foreign Application Priority Data

Aug. 10, 2012  (JP) .................................. 2012-178196

(51) Int. Cl.
    *C09D 133/12*   (2006.01)
    *C09D 125/14*   (2006.01)
    (Continued)

(52) U.S. Cl.
    CPC .............. *C09D 133/12* (2013.01); *C08F 2/44* (2013.01); *C08F 292/00* (2013.01);
    (Continued)

(58) Field of Classification Search
    None
    See application file for complete search history.

(56) References Cited

U.S. PATENT DOCUMENTS 6,783,914 B1 *  8/2004  Fedynyshyn ......... G03F 7/0047
                                                    430/190
6,913,865 B2 *  7/2005  Fedynyshyn ......... G03F 7/0047
                                                    430/191
(Continued)

FOREIGN PATENT DOCUMENTS

JP    2005120365 A    5/2005
JP    2005-162911 A   6/2005
(Continued)

OTHER PUBLICATIONS

Arita (Efficient Production of Block-copolymer-coated Ceramic nanoparticles by Sequential Reversible Addition—Fragmentation Chain-Transfer Polymerizations with Particles (SqRAFTwP), Chem. Lett. 2013, 42, pp. 801-803, Published on the web May 31, 2013, The Chemical Society of Japan.*
(Continued)

*Primary Examiner* — Tae H Yoon
(74) *Attorney, Agent, or Firm* — Oliff PLC

(57) ABSTRACT

Organic-inorganic composite particles including: inorganic particles; and an organic polymer, wherein the inorganic particles have surfaces on which no modification treatment for introducing a polymerizable reactive group is conducted, the organic polymer comprises a hydrophilic block arranged on the surfaces of the inorganic particles and made of a first polymer, and a hydrophobic block stacked on an outside of the hydrophilic block and made of a second polymer, and the inorganic particles, the first polymer, and the second polymer have surface free energies satisfying a condition expressed by the following formula:

$$E_{NP} > E_A > E_B$$

[in the formula, $E_{NP}$ represents the surface free energy of the inorganic particles, $E_A$ represents the surface free energy of (Continued)

the first polymer, and $E_B$ represents the surface free energy of the second polymer].

7 Claims, 6 Drawing Sheets

(51) Int. Cl.
    *C08K 9/08*     (2006.01)
    *C08K 9/10*     (2006.01)
    *C08K 9/12*     (2006.01)
    *C08L 101/02*     (2006.01)
    *C08F 292/00*     (2006.01)
    *C08F 2/44*     (2006.01)
    *C08F 293/00*     (2006.01)

(52) U.S. Cl.
    CPC ............ *C08F 293/005* (2013.01); *C08K 9/08* (2013.01); *C08K 9/12* (2013.01); *C09D 125/14* (2013.01); *C08F 2438/01* (2013.01); *C08F 2438/02* (2013.01); *C08K 2201/003* (2013.01); *Y10T 428/2998* (2015.01)

(56) References Cited

U.S. PATENT DOCUMENTS

| | | | |
|---|---|---|---|
| 8,735,466 B2* | 5/2014 | Schutyser | B82Y 30/00 523/205 |
| 9,598,563 B2* | 3/2017 | Okamatsu | B60C 1/0016 |
| 9,983,327 B2* | 5/2018 | Johnston | B82Y 30/00 |
| 2007/0123608 A1 | 5/2007 | Nakahama et al. | |
| 2008/0248209 A1 | 10/2008 | Chapel et al. | |
| 2009/0076207 A1 | 3/2009 | Destarac et al. | |
| 2010/0087603 A1* | 4/2010 | Brittain | B82Y 30/00 525/342 |
| 2010/0297432 A1* | 11/2010 | Sherman | B22F 7/04 428/325 |
| 2010/0317788 A1 | 12/2010 | Schutyser et al. | |
| 2011/0061891 A1 | 3/2011 | Schadler et al. | |

FOREIGN PATENT DOCUMENTS

| | | | |
|---|---|---|---|
| JP | 2007-119586 A | 5/2007 | |
| JP | 2008-540722 A | 11/2008 | |
| JP | 2009-542894 A | 12/2009 | |
| JP | 2010185023 A | 8/2010 | |
| JP | 2011-137082 A | 7/2011 | |
| JP | 2011-162718 A | 8/2011 | |
| JP | 2011213865 A | 10/2011 | |
| JP | 2011246546 A | 12/2011 | |
| WO | 2008/023581 A1 | 2/2008 | |

OTHER PUBLICATIONS

Nov. 12, 2013 International Search Report issued in International Patent Application No. PCT/JP2013/071725.
Apr. 16, 2015 International Preliminary Report on Patentability issued in International Patent Application No. PCT/JP2013/071725.
Mar. 11, 2016 Office Action issued in U.S. Appl. No. 14/420,802.
Aug. 9, 2017 Office Action issued in U.S. Appl. No. 14/420,802.
Yaws, Carl L, "Yaws' Thermophysical Properties of Chemicals and Hydrocarbons," Table: Surface Tensions—Elements and Inorganic Compounds, 2010.
"Surface Energy Data—Assorted Polymers," Diversified Enterprises, http://www.accudynetest.com/polymer_surface_data/other_polymers.pdf, 2009.
Yaws, Carl L., "Yaws' Handbook of Thermodynamic and Phyiscal Properties of Chemical Compounds," Table: Surface Tension, 2003.
Oct. 21, 2016 Office Action issued in U.S. Appl. No. 14/420,802.

* cited by examiner

ORGANIC-INORGANIC COMPOSITE PARTICLES, DISPERSION AND RESIN COMPOSITION COMPRISING THE SAME, AND METHOD FOR PRODUCING ORGANIC-INORGANIC COMPOSITE PARTICLES

This is a Division of application Ser. No. 14/420,802 filed Feb. 10, 2015, now abandoned, which in turn is a national stage of PCT/JP2013/071725, filed Aug. 9, 2013, which claims the benefit of JP 2012-178196, filed Aug. 10, 2012. The disclosure of the prior applications is hereby incorporated by reference herein in its entirety.

TECHNICAL FIELD

The present invention relates to organic-inorganic composite particles, a dispersion comprising the particles, a resin composition comprising the particles, and a method for producing organic-inorganic composite particles. More specifically, the present invention relates to organic-inorganic composite particles comprising inorganic particles and an organic polymer, a dispersion comprising the composite particles, a resin composition comprising the composite particles, and a method for producing the organic-inorganic composite particles.

BACKGROUND ART

Recently, organic-inorganic composite particles, which are composites of inorganic particles and organic polymers, have attracted attention, because they are materials capable of simultaneously expressing trade-off functions of organic materials and inorganic materials. As a method for producing organic-inorganic composite particles, for example, Japanese Unexamined Patent Application Publication No. 2005-120365 (PTL 1) describes a method for producing polymer-coated particles, in which a radical polymerization is conducted in the presence of nucleus particles mixed with a coupling agent having a polymerizable reactive group, a monomer component, and a polymerization initiator to coat the surface of each of the nucleus particle with a polymer layer. However, in this method, polymerizable reactive groups are introduced onto the surfaces of the inorganic particles by covering the surfaces of the particles with the coupling agent containing Si or the like to bond the inorganic particles and the organic polymer to each other. Hence, this method has the following problems. Specifically, the obtained composite cannot sufficiently exhibit the physical properties and functions intrinsic to the inorganic particles; the packing fraction of the inorganic particles in packing decreases; and the dispersibility in a solvent is insufficient. Moreover, this method also has problems of the multi-stage production process and the difficult mass-production.

Meanwhile, as a production method which does not require the use of the above-described coupling agent or the like, for example, Japanese Unexamined Patent Application Publication No. 2011-162718 (PTL 2) describes a method in which starting points for radical polymerization are introduced to the surfaces of inorganic particles by conducting an ozone treatment or a plasma treatment. This method makes it possible to obtain organic-inorganic composite particles which are stable and which can be packed with a high packing fraction. However, this method has a problem of a still insufficient content ratio of the organic polymer, and problems of the multi-stage production process and the difficult mass-production.

Moreover, Japanese Unexamined Patent Application Publication No. 2011-213865 (PTL 3) describes a method in which an organic material layer derived from a radical polymerizable monomer is formed on the surfaces of inorganic particles by a reaction in a mixture liquid containing the inorganic particles, the monomer, an initiator having a partial structure made of an ethylene glycol polymer, and a surfactant. However, this method has such a problem that the composite obtained by this method has a low content ratio of the organic polymer, and has an insufficient dispersibility in a solvent. Moreover, this method also has problems in terms of the production process and the mass-production.

In addition, Japanese Unexamined Patent Application Publication No. 2010-185023 (PTL 4) describes organic-inorganic composite particles having a so-called onion-like structure in which an organic material comprising two or more components forms separated phases, and at least one of the phases comprises inorganic particles, and Japanese Unexamined Patent Application Publication No. 2011-246546 (PTL 5) describes an organic-inorganic composite having a network structure formed by inorganic particles in a polymer of a radical-polymerizable monomer. However, the composite particles and the composite have such problems that it is difficult to individually coat the particle surfaces of the inorganic particles with an organic polymer, and that the dispersibility in a solvent is insufficient.

CITATION LIST

Patent Literature

[PTL 1] Japanese Unexamined Patent Application Publication No. 2005-120365
[PTL 2] Japanese Unexamined Patent Application Publication No. 2011-162718
[PTL 3] Japanese Unexamined Patent Application Publication No. 2011-213865
[PTL 4] Japanese Unexamined Patent Application Publication No. 2010-185023
[PTL 5] Japanese Unexamined Patent Application Publication No. 2011-246546

SUMMARY OF INVENTION

Technical Problem

The present invention has been made in view of the above-described problems of the conventional technologies, and an object of the present invention is to provide organic-inorganic composite particles having an excellent dispersibility in a solvent, a dispersion comprising the particles, a resin composition comprising the particles, and a method for producing organic-inorganic composite particles which enables the organic-inorganic composite particles to be obtained easily in a large amount without conducting a modification treatment for introducing a polymerizable reactive group on the surfaces of inorganic particles.

Solution to Problem

The present inventors have conducted intensive study to achieve the above-described object, and consequently found the following facts. Specifically, first, a first monomer is polymerized in a reaction solution containing inorganic particles, the first monomer, and a solvent satisfying a specific condition. Thus, even without conducting a modification treatment for introducing a polymerizable reactive group on the surfaces of the inorganic particles, the obtained specific first polymer can be adsorbed and arranged on the surfaces of the inorganic particles to obtain a hydrophilic block made of the first polymer. Subsequently, a specific second monomer is added to the reaction solution, and polymerized. Thus, the obtained specific second polymer can be stacked on an outside of the hydrophilic block to obtain a hydrophobic block made of the second polymer. In this manner, organic-inorganic composite particles can be obtained in which the surfaces of the inorganic particles are coated with the hydrophilic block made of the first polymer and the hydrophobic block made of the second polymer, and which has an excellent dispersibility in a solvent.

Moreover, the present inventors have found that this method is applicable to a wide range of inorganic particles, and this method makes it possible to easily mass-produce the organic-inorganic composite particles in which an organic polymer is arranged at a high content ratio on the surfaces of inorganic particles and no modification agent such as a silane coupling agent is contained. These findings have led to the completion of the present invention.

Specifically, organic-inorganic composite particles of the present invention are organic-inorganic composite particles comprising:

inorganic particles; and an organic polymer, wherein the inorganic particles have surfaces on which no modification treatment for introducing a polymerizable reactive group is conducted, the organic polymer comprises a hydrophilic block (A) arranged on the surfaces of the inorganic particles and made of a first polymer, and a hydrophobic block (B) stacked on an outside of the hydrophilic block (A) and made of a second polymer, and the inorganic particles, the first polymer, and the second polymer have surface free energies satisfying a condition expressed by the following formula (1):

$$E_{NP} > E_A > E_B \tag{1}$$

[in the formula (1), $E_{NP}$ represents the surface free energy of the inorganic particles, $E_A$ represents the surface free energy of the first polymer, and $E_B$ represents the surface free energy of the second polymer].

In the organic-inorganic composite particles of the present invention, a content of the organic polymer per unit surface area of the inorganic particles is preferably 0.0005 to 1.0 chains/nm$^2$, and a mass ratio between the first polymer and the second polymer (a mass of the first polymer:a mass of the second polymer) is preferably 1:1 to 1:500.

Moreover, in the organic-inorganic composite particles of the present invention, the organic polymer preferably has a number average molecular weight of 3,000 to 1,000,000 g/mol, and a molecular weight distribution (weight average molecular weight/number average molecular weight) of 1.05 to 2.0. In addition, the organic-inorganic composite particles of the present invention preferably have particle diameters of 1.6 to 10,000 nm.

A dispersion of the present invention comprises the above-described organic-inorganic composite particles of the present invention and a solvent. In addition, a resin composition of the present invention comprises the above-described organic-inorganic composite particles of the present invention and a resin.

A method for producing organic-inorganic composite particles of the present invention is a method for producing organic-inorganic composite particles comprising inorganic particles and an organic polymer, the method comprising:

a first polymerization step of obtaining a hydrophilic block (A) made of a first polymer by conducting a living radical polymerization of a first monomer in a reaction solution containing the inorganic particles, the first monomer, and a solvent, without conducting a modification treatment for introducing a polymerizable reactive group on surfaces of the inorganic particles, and allowing the first polymer thus obtained to be adsorbed on the surfaces of the inorganic particles; and a second polymerization step of obtaining a hydrophobic block (B) made of a second polymer by adding a second monomer to the reaction solution after the first polymerization step, conducting a living radical polymerization of the second monomer, and polymerizing the second polymer thus obtained onto growing ends of the first polymer, to stack the second polymer on an outside of the hydrophilic block (A), wherein the inorganic particles, the first polymer, the second polymer, and the solvent have surface free energies satisfying a condition expressed by the following formula (2):

$$E_{NP} > E_A > E_B > E_S \tag{2}$$

[in the formula (2), $E_{NP}$ represents the surface free energy of the inorganic particles, $E_A$ represents the surface free energy of the first polymer, $E_B$ represents the surface free energy of the second polymer, and $E_S$ represents the surface free energy of the solvent].

Note that although it is not exactly clear why the present invention achieves the above-described object, the present inventors speculate as follows. Specifically, in the present invention, as shown in a flowchart of FIG. 1, first, a first monomer 2 from which a relatively hydrophilic first polymer 3 having a high surface free energy can be obtained is polymerized in a solvent which is a good solvent for the first monomer and the second monomer but has a lower surface free energy than the first polymer and the second polymer in the presence of inorganic particles having a higher surface free energy than the first polymer 3. Thus, as the polymerization proceeds, the obtained first polymer 3 is accumulated (adsorbed) to form a hydrophilic block (A), while covering the surfaces of the inorganic particles. Subsequently, a second monomer 4 is added to the solvent and polymerized, and also the obtained second polymer is polymerized onto growing ends of the first polymer 3. Thus, a second polymer 5 is stacked on an outside of the hydrophilic block (A) to form a hydrophobic block (B).

In addition, here, the surface free energies of the inorganic particles, the obtained first and second polymers, and the solvent are adjusted to satisfy a specific condition. Hence, the hydrophilic block (A) is prevented from being exposed on the topmost surface, and an organic polymer layer having a stable two-layer structure can be formed in which the surface of the hydrophilic block (A) is covered with the hydrophobic block (B). The present inventors speculate that, for this reason, the organic-inorganic composite particles in which the organic polymer is stably arranged at a high content ratio on the surfaces of the inorganic particles can be obtained, and an excellent dispersibility in a solvent can be exhibited.

Moreover, in the present invention, it is not necessary to conduct a modification treatment for introducing a polymerizable reactive group on the surfaces of the inorganic particles. The present inventors speculate that, for this reason, no components originated from a modification agent are contained, so that the inorganic particles and/or the organic polymer can sufficiently exhibit their intrinsic physical properties and functions. The present inventors speculate that since the method of the present invention utilizes only the difference in surface free energy (surface tension) among the inorganic particles, the monomers, the polymers, and the solvent as described above, the organic-inorganic composite particles in which the surfaces of the inorganic particle are modified by the organic polymer can be obtained easily at low costs in a large amount, without imposing any limitation on the type of the inorganic particles.

In contrast, in the polymer-coated particles described in Cited Literature 1, the surfaces of the inorganic particles are covered with the coupling agent containing an inorganic component such as a silane coupling agent. Hence, the physical properties and functions of the inorganic particles serving as the nuclei cannot be sufficiently exhibited. In addition, since the organic polymer layer is formed by simultaneously polymerizing two or more monomers, the constitution of the organic polymer covering the inorganic particles cannot be sufficiently controlled. The present inventors speculate that, for these reasons, it is difficult to obtain a sufficient dispersibility in a solvent.

Advantageous Effects of Invention

According to the present invention, it is possible to provide organic-inorganic composite particles having an excellent dispersibility in a solvent, a dispersion comprising the particles, a resin composition comprising the particles, and a method for producing organic-inorganic composite particles which enables the organic-inorganic composite particles to be obtained easily in a large amount without conducting a modification treatment for introducing a polymerizable reactive group on the surfaces of inorganic particles.

DESCRIPTION OF EMBODIMENTS

Figure 1:
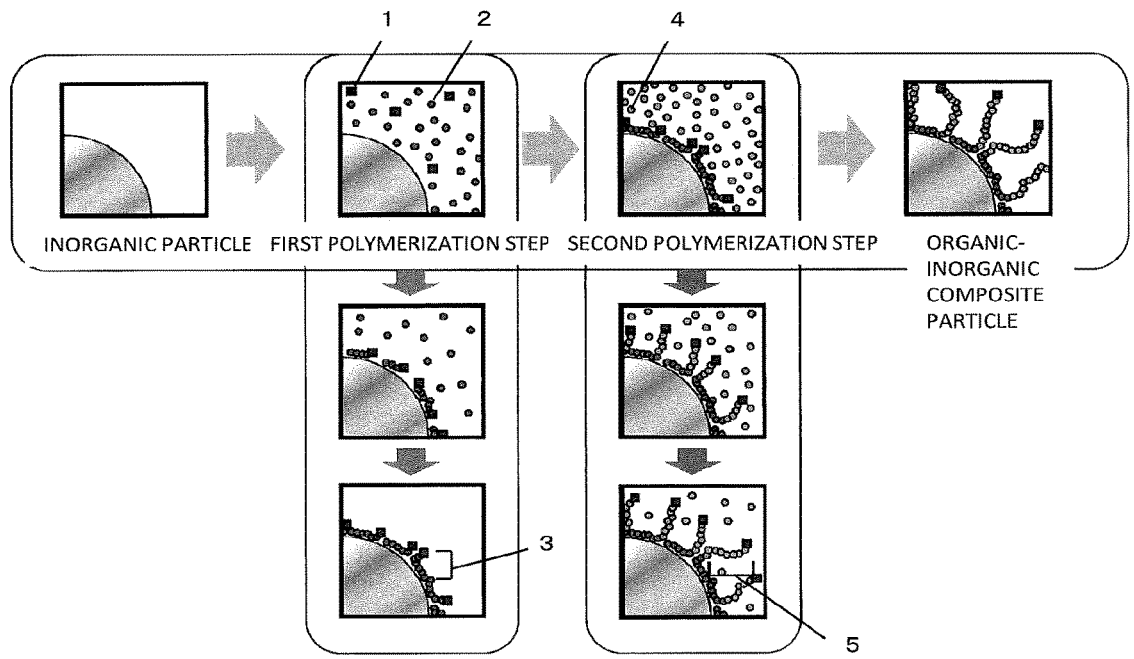
FIG. 1 is a flowchart showing a method for producing organic-inorganic composite particles of the present invention.
Figure 2A:
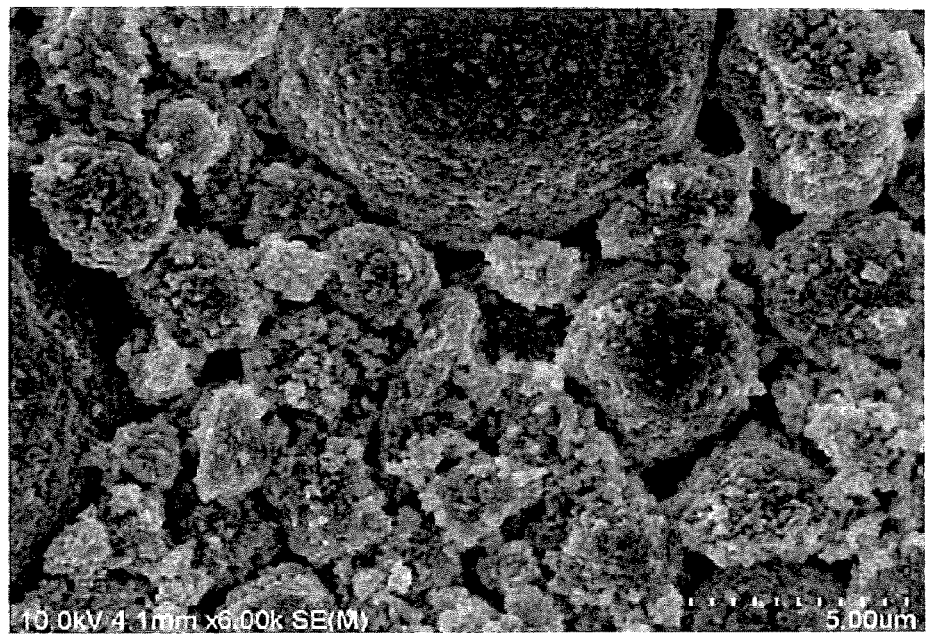
FIG. 2A is a scanning electron micrograph of particles obtained in Example 1.
Figure 2B:
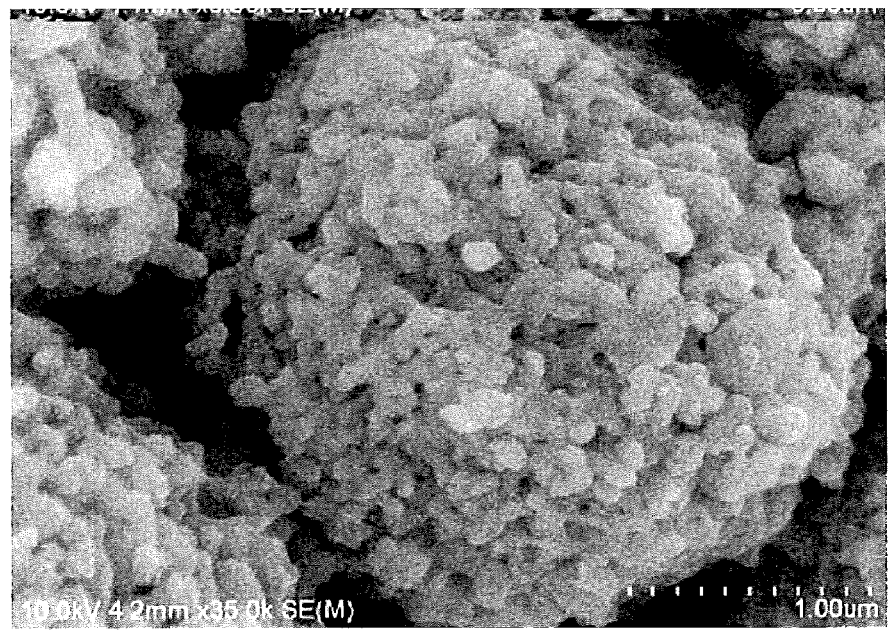
FIG. 2B is an enlarged scanning electron micrograph of the particles obtained in Example 1.
Figure 3A:
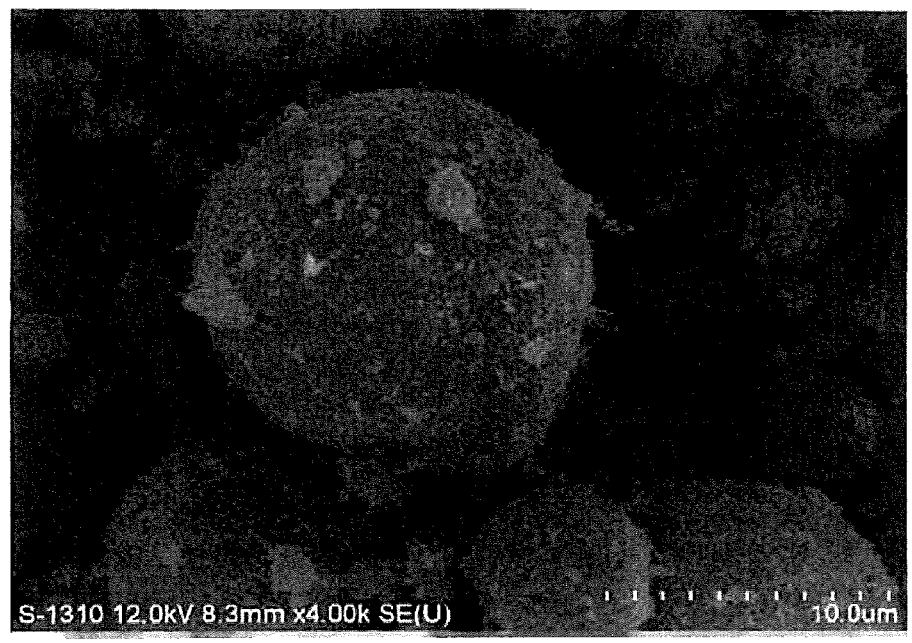
FIG. 3A is a scanning electron micrograph of particles obtained in Comparative Example 1.
Figure 3B:
FIG. 3B is an enlarged scanning electron micrograph of the particles obtained in Comparative Example 1.
Figure 4:
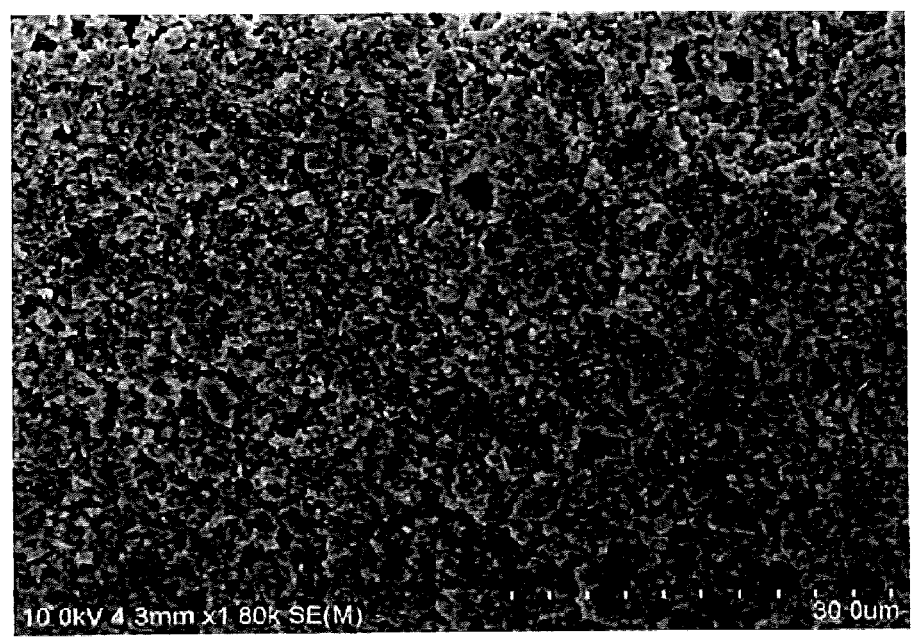
FIG. 4 is a scanning electron micrograph of particles obtained in Example 3.
Figure 5:
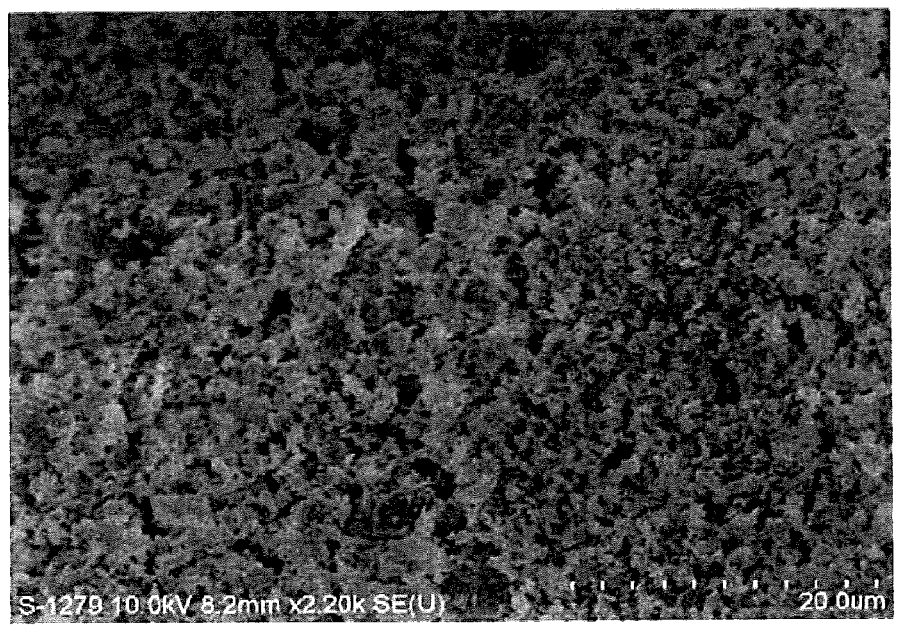
FIG. 5 is a scanning electron micrograph of particles obtained in Comparative Example 2.

Hereinafter, the present invention will be described in detail based on preferred embodiments thereof.

First, organic-inorganic composite particles of the present invention are described. The organic-inorganic composite particles of the present invention are organic-inorganic composite particles comprising:
inorganic particles; and
an organic polymer, wherein
the inorganic particles have surfaces on which no modification treatment for introducing a polymerizable reactive group is conducted,
the organic polymer comprises a hydrophilic block (A) arranged on the surfaces of the inorganic particles and made of a first polymer, and a hydrophobic block (B) stacked on an outside of the hydrophilic block (A) and made of a second polymer, and
the inorganic particles, the first polymer, and the second polymer have surface free energies satisfying a condition expressed by the following formula (1):

$$E_{NP} > E_A > E_B \tag{1}$$

[in the formula (1), $E_{NP}$ represents the surface free energy of the inorganic particles, $E_A$ represents the surface free energy of the first polymer, and $E_B$ represents the surface free energy of the second polymer].

The inorganic particles according to the present invention are not particularly limited, and examples thereof include inorganic particles made of metal oxides, metal nitrides, or nitride ceramics. The metals are not particularly limited, as long as particles of the metals can be produced with particle diameters of about 1 to 10,000 nm. Specific examples of the metals include elements on a boundary line formed by boron (B) of group IIIB, silicon (Si) of group IVB, arsenic (As) of group VB, and tellurium (Te) of group VIB in a long periodic table, and elements on the left and lower side of the boundary line in the long periodic table. More specifically, examples of the metals include B, Si, As, Te, Li, Be, Na, Mg, Al, K, Ca, Sc, Ti, V, Cr, Mn, Fe, Co, Ni, Cu, Zn, Ga, Ge, Rb, Sr, Y, Zr, Nb, Mo, Tc, Ru, Rh, Pd, Ag, Cd, In, Sn, Sb, Cs, Ba, Hf, Ta, W, Re, Os, Ir, Pt, Au, Hg, Tl, Pb, Bi, Po, Fr, Ra, La, Ce, Pr, Nd, Pm, Sm, Eu, Gd, Tb, Dy, Ho, Er, Tm, Yb, Lu, Ac, Th, Pa, U, Np, Pu, Am, Cm, Bk, Cf, Es, Fm, Md, No, Lr, and the like. One of these metals may be used alone, or two or more thereof may be used in combination.

Examples of the metal oxides, the metal nitrides, and the nitride ceramics include $Al_2O_3$, $CeO_2$, CoO, $CO_3O_4$, $Co_3O_4$, $Eu_2O_3$, $Fe_2O_3$, $Fe_3O_4$, $Gd_2O_3$, $In_2O_3$, NiO, $TiO_2$, $Y_2O_3$, ZnO, $ZrO_2$, $BaTiO_3$, AlN, TiN, BN, and $SiO_x$. One of these materials may be used alone, or two or more thereof may be used in combination.

Of these materials, the inorganic particles according to the present invention are preferably made of $Al_2O_3$ and/or $SiO_2$, and more preferably made of $Al_2O_3$ from the viewpoints that the stability of the organic-inorganic composite particles is further improved and the dispersibility in a solvent is improved, and that the content ratio of the organic polymer can be easily improved, in a case where the first polymer described later is polyethyl acrylate and the second polymer described later is polystyrene. Meanwhile, in a case where the first polymer described later is polyhydroxyethyl acrylate and the second polymer described later is polystyrene, the inorganic particles according to the present invention are preferably made of $Al_2O_3$ and/or $SiO_2$, and more preferably made of $SiO_2$, from the same viewpoints as described above.

The inorganic particles according to the present invention have particle diameters of preferably 1 to 10,000 nm, more preferably 3 to 10,000 nm, and further preferably 5 to 1,000 nm. If the particle diameters are less than the lower limit, the content ratio of the polymer tends to be excessively high.

Meanwhile, if the particle diameters exceed the upper limit, the dispersibility in a solvent or a resin tends to decrease. Note that, in the present invention, the particles are each preferably in a form of a particle having an aspect ratio of 1 to 3, which is expressed by a ratio (longest diameter/ shortest diameter) between the longest diameter and the shortest diameter. In addition, each of the particle diameters refers to the diameter of a circumscribed circle of the particle in a cross-section, and can be determined by observation under a scanning electron microscope (SEM).

In addition, the inorganic particles according to the present invention need to have a surface free energy ($E_{NP}$) higher than the surface free energy ($E_A$) of the first polymer. In general, the surface free energy of an inorganic particle is extremely higher than the surface free energy of a polymer. If $E_{NP}$ is not higher than $E_A$, the stability of the organic-inorganic composite particles decreases, and the dispersibility in a solvent decreases.

Note that the surface free energy refers to the excess energy of molecules (or atoms) at a surface of a solid or a liquid in comparison with molecules (or atoms) inside the substance. In the present invention, the surface free energy refers to a surface free energy at 20° C. In the present invention, the surface energy can be determined by a known method. For example, the surface free energy of a solid can be determined by measuring the water droplet contact angle of water on a surface of a solid sample, and then finding the surface free energy from the measured value and the known surface free energy of water by using the Young equation. Meanwhile, the surface free energy of a liquid can be determined by measurement based on the ring method using a du Noüy tensiometer. Note that the surface free energy of the inorganic particles according to the present invention can be determined by the above-described method for measuring the surface free energy of a solid in which a substrate is prepared from the same inorganic material, and the substrate whose surface has been cleaned is used as a solid sample.

Moreover, as the inorganic particles according to the present invention, even inorganic particles having surfaces on which no modification treatment for introducing a polymerizable reactive group is conducted are preferably used. Examples of the polymerizable reactive group include a methacrylic group, an acrylic group, a vinyl group, and the like. Since any influence due to the modification treatment is absent in the present invention, intrinsic physical properties and functions of the inorganic particles and/or the organic polymer can be sufficiently exhibited, the stability of the organic-inorganic composite particles can be improved, and the organic-inorganic composite particles can be obtained easily in a large amount.

Examples of the modification treatment include a method using a coupling agent having a polymerizable reactive group; a method using a surfactant having a polymerizable reactive group; and the like. Examples of the coupling agent include silane coupling agents, titanate coupling agents, and the like, and examples of the surfactant include carboxylic acid derivatives, phosphonic acid derivatives, phosphoric acid derivatives, amine derivatives, sulfonic acid derivatives, and the like.

In addition, it is preferable that no surface treatment with an alkylene glycol polymer or a surfactant be conducted on the inorganic particles according to the present invention from the viewpoint that the stability of the organic-inorganic composite particles is further improved. From the viewpoint that the organic-inorganic composite particles can be obtained easily in a large amount when the inorganic particles are used as a raw material for production, it is more preferable that none of an ozone treatment and a plasma treatment be conducted on the inorganic particles. From the viewpoint that the production is easier, it is preferable that no surface treatment for introducing a reaction group (a carboxyl group, an amino group, an isocyanate group, an acid anhydride group, or the like) for bonding with the organic polymer, other than the polymerizable reactive group be conducted on the inorganic particles. Note that inorganic particles subjected to any of these modification treatments and surface treatments can be detected by a method in which cross-sections of the organic-inorganic composite particles are observed under a scanning electron microscope or a transmission electron microscope, an analysis of an infrared absorption spectrum, or the like. Here, in the inorganic particles according to the present invention, the total content of the coupling agent having the polymerizable reactive group and the surfactant having the polymerizable reactive group is preferably less than 0.1% by mass, and more preferably less than 0.05% by mass relative to the inorganic particle (excluding the coupling agent and the surfactant).

The organic polymer according to the present invention comprises a hydrophilic block (A) arranged (adsorbed) on the surfaces of the inorganic particles and made of a first polymer and a hydrophobic block (B) stacked on an outside of the hydrophilic block (A) and made of a second polymer.

The organic-inorganic composite particles of the present invention each have a structure in which the hydrophobic block (B) having a relatively low hydrophilicity is stacked on the outside of the hydrophilic block (A) having a relatively high hydrophilicity. Hence, excellent stability and dispersibility are exhibited, even without conducing the above-described modification treatment for introducing a polymerizable reactive group or the above-described surface treatment on the surfaces of the inorganic particles. In addition, in the organic-inorganic composite particles of the present invention, the organic polymer is arranged on the surface of the inorganic particle, without any modification agent such as the coupling agent described above, more preferably, a surfactant, or the like being interposed therebetween. Hence, the inorganic particles and the organic polymer can sufficiently exhibit their intrinsic physical properties and functions.

From the viewpoint that better stability and dispersibility are exhibited, the organic-inorganic composite particles of the present invention are preferably as follows. Specifically, the inorganic particles are preferably physically adsorbed onto the organic polymer by an intermolecular force between the inorganic particles and the first polymer, and the organic polymer is preferably a block polymer in which the first polymer and the second polymer are polymerized.

Note that, in the present invention, the hydrophilicity and the hydrophobicity of the hydrophilic block (A) and the hydrophobic block (B) are defined based on the relative affinity for water in a comparison between the first polymer in the hydrophilic block (A) and the second polymer in the hydrophobic block (B). A block made of a polymer having a higher surface free energy (i.e., the first polymer) is referred to as the hydrophilic block, and a block made of a polymer having a lower surface free energy (i.e., the second polymer) is referred to as the hydrophobic block.

In the present invention, the first polymer and the second polymer only need to be such that the inorganic particles, the first polymer, and the second polymer have surface free energies satisfying a condition expressed by the following formula (1):

$$E_{NP} > E_A > E_B \qquad (1)$$

[in the formula (1), $E_{NP}$ represents the surface free energy of the inorganic particles, $E_A$ represents the surface free energy of the first polymer, and $E_B$ represents the surface free energy of the second polymer]. When $E_{NP}$ is not higher than $E_A$ and/or when $E_A$ is not higher than $E_B$, the stability of the organic-inorganic composite particles decreases, so that the composite particles cannot be obtained, and also the dispersibility in a solvent decreases. Note that, in the present invention, the surface free energy of each of the first polymer and the second polymer can be determined by measurement based on the same method as described above in which a sample film is prepared from the polymer, and the film whose surface has been cleaned is used as a solid sample.

Although it depends on the types of the inorganic particles and the second polymer, the first polymer is preferably a linear or branched polymer obtained by homopolymerization or copolymerization of a hydrophilic radical-polymerizable monomer from the viewpoint that the surface free energy is highly likely to satisfy the condition expressed by the above-described formula (1). Examples of the hydrophilic radical-polymerizable monomers include monomers having a hydrophilic group and a vinyl group, and specific examples thereof include acrylic acid, methacrylic acid, acrylamide, allyl acrylate, methyl acrylate, ethyl acrylate, acrylonitrile, methyl methacrylate, glycidyl acrylate, glycidyl methacrylate, hydroxyethyl acrylate, acryloyl chloride, methacryloyl chloride, allylacetic acid, allyl alcohol, allyl chloride, allyl amide, allylisocyanate, methylvinyl methyl ketone, vinyl acetate, vinyl chloride, vinyl ethyl ester, vinyl ethyl ketone, sodium p-styrenesulfonate, and the like. The first polymer according to the present invention may be a polymer obtained by using one of these monomers alone or two or more thereof in combination. As long as the surface free energies satisfy the condition expressed by the above-described formula (1), the first polymer according to the present invention may be a polymer obtained by using a hydrophobic radical-polymerizable monomer described below in combination. Especially, polymethylacrylate, polyethylacrylate, polyhydroxyethyl acrylate, polymethyl methacrylate, and polyhydroxyethyl methacrylate are preferable from the viewpoint that the stability of the organic-inorganic composite particles is further improved, and it tends to be possible to suppress the aggregation of the particles during the polymerization in the production process.

Meanwhile, although it depends on the type of the first polymer, the second polymer is preferably a linear or branched polymer obtained by homopolymerization or copolymerization of a hydrophobic radical-polymerizable monomer from the viewpoint that the surface free energy is highly likely to satisfy the condition expressed by the above-described formula (1). The hydrophobic radical-polymerizable monomer may be a monomer not having any hydrophilic group but having a vinyl group, and examples thereof include styrene, divinylbenzene, methylstyrene, butyl acrylate, ethyl methacrylate, butyl methacrylate, lauryl acrylate, lauryl methacrylate, stearyl acrylate, stearyl methacrylate, behenyl acrylate, behenyl methacrylate, cyclohexyl acrylate, cyclohexyl methacrylate, trifluoropropyl acrylate, trifluoropropyl methacrylate, isoprene, 1,4-butadiene, and the like. The second polymer according to the present invention may be a polymer obtained by using one of these monomers alone or two or more thereof in combination. As long as the surface free energies satisfy the condition expressed by the above-described formula (1), the second polymer according to the present invention may be a polymer obtained by using any of the above-described hydrophilic radical-polymerizable monomers in combination. Especially, polystyrene is preferable from the viewpoint that the stability of the organic-inorganic composite particles is further improved, and the dispersibility in a resin or an organic solvent such as toluene is better.

In addition, neither the first polymer nor the second polymer according to the present invention is limited to the above-described polymers. The first polymer and the second polymer only need to satisfy the condition expressed by the above-described formula (1), and, for example, it is also possible to use polyhydroxyethyl methacrylate as the first polymer and polymethyl methacrylate as the second polymer.

The organic polymer according to the present invention has a number average molecular weight of preferably 3,000 to 1,000,000 g/mol, and more preferably 5,000 to 500,000 g/mol. If the number average molecular weight is lower than the lower limit, the dispersion stability in a polymer resin tends to decrease. Meanwhile, if the number average molecular weight exceeds the upper limit, the dispersion stability in a liquid solvent tends to decrease.

In addition, the organic polymer according to the present invention has a molecular weight distribution (weight average molecular weight/number average molecular weight) of preferably 1.05 to 2.0, and more preferably 1.05 to 1.7. If the molecular weight distribution exceeds the upper limit, the dispersibility in a solvent tends to decrease, because molecules of the organic polymer are easily entangled with each other.

Moreover, in the organic-inorganic composite particles of the present invention, a mass ratio between the first polymer and the second polymer (a mass of the first polymer:a mass of the second polymer) is preferably 1:1 to 1:1,000, more preferably 1:1 to 1:500, and further preferably 1:2 to 1:500. If the ratio of the first polymer is less than the lower limit, the hydrophobicity of the surfaces of the inorganic particles tends to be insufficient. Meanwhile, if the ratio of the first polymer exceeds the upper limit, the organic polymer tends to easily desorb from the surfaces of the inorganic particles.

In addition, in the organic-inorganic composite particles of the present invention, a content of the organic polymer in terms of the number of molecules (the number of chains) per unit surface area of the inorganic particles is preferably 0.0005 to 1.0 chains/nm$^2$, and more preferably 0.001 to 0.5 chains/nm$^2$. If the content per unit surface area is less than the lower limit, the dispersibility in a solvent tends to decrease. Meanwhile, if the content per unit surface area exceeds the upper limit, the packing fraction of the inorganic particles tends to decrease, when the inorganic particles are packed.

Furthermore, the content ratio of the organic polymer relative to all the organic-inorganic composite particles of the present invention is preferably 1 to 20% by mass, although it depends on the surface area and mass of the inorganic particles. If the content ratio is less than the lower limit, the dispersibility in a solvent or a resin tends to decrease. Meanwhile, if the content ratio exceeds the upper limit, the content ratio of the inorganic particles tends to decrease, when the organic-inorganic composite particles are dispersed in a solvent or a resin.

In the organic-inorganic composite particles of the present invention, the surfaces of the inorganic particles are preferably covered with the organic polymer without any uncovered portion, from the viewpoint that better stability and dispersibility are exhibited. In addition, the organic-inorganic composite particles of the present invention more preferably each comprise a hydrophilic polymer layer (A) arranged (adsorbed) on the surface of the inorganic particle and made of the first polymer and a hydrophobic polymer layer (B) stacked on the surface of the hydrophilic polymer layer (A) and made of the second polymer.

When the first polymer forms the hydrophilic polymer layer (A), a coating ratio of the surface of the inorganic particle is preferably 50% by area or higher, and more preferably 80% by area or higher. In addition, when the second polymer forms the hydrophobic polymer layer (B), a coating ratio of the surface of the hydrophilic polymer layer (A) is preferably 30% by area or higher, and more preferably 50% by area or higher.

In addition, the thickness of the hydrophilic polymer layer (A) here is preferably 0.1 to 20 nm, and the thickness of the hydrophobic polymer layer (B) here is preferably 0.2 to 100 nm. Moreover, the organic-inorganic composite particles of the present invention have particle diameters of preferably 1.6 to 10,000 nm, more preferably 3.3 to 10,000 nm, and further preferably 5.3 to 1,100 nm. If the particle diameters are less than the lower limit, the content ratio of the organic polymer in the organic-inorganic composite particles tends to be excessively high. Meanwhile, if the particle diameters exceed the upper limit, the dispersibility in a solvent or a resin tends to decrease. Note that, in the present invention, the thicknesses of the hydrophilic polymer layer (A) and the hydrophobic polymer layer (B) and the particle diameters of the organic-inorganic composite particles can be measured by observation under a scanning electron microscope (SEM). The thicknesses of the hydrophilic polymer layer (A) and the hydrophobic polymer layer (B) can also be determined by calculation from the content ratio of the organic polymer obtained by a thermogravimetric (TG) analysis.

In addition, the organic-inorganic composite particles of the present invention may further comprise other metal particles such as metal nanoparticles, a surfactant, a polymer having a surface-activating ability, a living radical polymerization initiator, a living radical polymerization catalyst, and the like, as long as an effect of the present invention is not impaired.

Next, a dispersion of the present invention is described. The dispersion of the present invention comprises the organic-inorganic composite particles of the present invention and a solvent. Because of the use of the organic-inorganic composite particles of the present invention, the dispersion of the present invention has an excellent dispersibility.

The solvent is preferably a good solvent for the second polymer from the viewpoints that the organic-inorganic composite particles of the present invention tends to be easily dispersed, because the inter-particle distances can be maintained by the swelling of the surfaces of the particles coated with the second polymer. In the present invention, the good solvent refers to a solvent in which a polymer to be dissolved has a theta temperature (Flory temperature, a temperature at which the second virial coefficient A2 equals to 0, where the stacking of polymer chains one another appears to be negligible, i.e., a temperature at which the polymer chains behave as ideal Gaussian chains) is lower than room temperature (20° C.). Examples of the solvent include toluene, chloroform, dichloromethane, tetrahydrofuran, and the like, although it depends on the type of the second polymer. One of these solvents may be used alone, or two or more thereof may be used in combination. Note that it is also possible to use a poor solvent for the second polymer as the solvent in such a manner that the surfaces of the organic-inorganic composite particles are swelled in the good solvent and the organic-inorganic composite particles are dispersed in the good solvent, and then the solvent is exchanged with the poor solvent. Note that a poor solvent in the present invention refers to a solvent in which the theta temperature is room temperature (20° C.) or higher.

In addition, a resin composition can be obtained instead of the dispersion of the present invention by using various resins such as an epoxy resin, a phenolic resin, a melamine resin, an olefin resin, a fluororesin, an acrylic resin, or the like instead of or in addition to the solvent.

Each of the dispersion and the resin composition may further comprise other metal particles such as metal nanoparticles, a surfactant, a polymer having a surface-activating ability, a living radical polymerization initiator, a living radical polymerization catalyst, and the like, as long as an effect of the present invention is not impaired.

Next, a method for producing organic-inorganic composite particles of the present invention is described. The method for producing organic-inorganic composite particles of the present invention is a method for producing organic-inorganic composite particles comprising inorganic particles and an organic polymer, the method comprising:

a first polymerization step of obtaining a hydrophilic block (A) made of a first polymer by conducting a living radical polymerization of a first monomer in a reaction solution containing the inorganic particles, the first monomer, and a solvent, without conducting a modification treatment for introducing a polymerizable reactive group on surfaces of the inorganic particles, and allowing the first polymer thus obtained to be adsorbed on the surfaces of the inorganic particles; and a second polymerization step of obtaining a hydrophobic block (B) made of a second polymer by adding a second monomer to the reaction solution after the first polymerization step, conducting a living radical polymerization of the second monomer, and polymerizing the second polymer thus obtained onto growing ends of the first polymer, to stack the second polymer on an outside of the hydrophilic block (A), wherein the inorganic particles, the first polymer, the second polymer, and the solvent have surface free energies satisfying a condition expressed by the following formula (2):

$$E_{NP} > E_A > E_B > E_S \quad (2)$$

[in the formula (2), $E_{NP}$ represents the surface free energy of the inorganic particles, $E_A$ represents the surface free energy of the first polymer, $E_B$ represents the surface free energy of the second polymer, and $E_S$ represents the surface free energy of the solvent]. This method makes it possible to easily obtain a large amount of the above-described organic-inorganic composite particles of the present invention.

In the method for producing organic-inorganic composite particles of the present invention, first, a hydrophilic block (A) made of a first polymer is obtained by conducting a living radical polymerization of a first monomer in a reaction solution containing the inorganic particles, the first monomer, and a solvent, without conducting a modification treatment for introducing a polymerizable reactive group on surfaces of the inorganic particles, and allowing the first polymer thus obtained to be adsorbed and arranged on the surfaces of the inorganic particles (the first polymerization step).

The inorganic particles are the same as described above for the organic-inorganic composite particles of the present invention. Note that particle diameters of the inorganic particles are preferably 1 to 10,000 nm, more preferably 3 to 10,000 nm, and further preferably 5 to 1,000 nm from the same viewpoints as described above. The particle diameters can be determined by observation under a scanning electron microscope (SEM). As the inorganic particles used for the production method of the present invention, it is also possible to use inorganic particles having a volume average particle diameter (APS) determined by a gas adsorption method within the above-describe range. In addition, the inorganic particles used for the production method of the present invention are not particularly limited, and can be produced by selecting, as appropriate, a method from conventionally known methods such as grinding methods, vapor phase methods, and liquid phase methods. Commercially available inorganic particles may be used as appropriate.

The first monomer is not particularly limited, as long as a polymer obtained by polymerization of the monomer can be the first polymer satisfying the condition expressed by the above-described formula (2). The monomers listed as the hydrophilic radical-polymerizable monomers for the organic-inorganic composite particles of the present invention can be used preferably. One of these first monomers may be used alone, or two or more thereof may be used in combination. As long as the surface free energy of the obtained polymer satisfies the condition expressed by the above-described formula (2), the above-described hydrophobic radical-polymerizable monomer may be used in combination. Especially, the first monomer is preferably methyl acrylate, ethyl acrylate, hydroxyethyl acrylate, methyl methacrylate, or hydroxyethyl methacrylate, from the viewpoint that more stable organic-inorganic composite particles can be obtained, and the aggregation of the particles during the polymerization tends to be suppressed. In addition, the first polymer is the same as described above for the organic-inorganic composite particles of the present invention.

The solvent is one which can dissolve or which is miscible with the first monomer and the second monomer described below, and needs to satisfy the condition expressed by the above-described formula (2). Note that the surface free energy of the solvent according to the present invention can be determined by measurement based on the ring method using a du Noüy-type tensiometer. Examples of the solvent include toluene, chloroform, dichloromethane, and tetrahydrofuran, although it depends on the types of the first monomer, the second monomer described below, the first polymer, and the second polymer. One of these solvents may be used alone, or two or more thereof may be used in combination.

In the production method of the present invention, no modification treatment for introducing a polymerizable reactive group is conducted on the surfaces of the inorganic particles before the addition to the reaction solution or in the reaction solution. The modification treatment is the same as described above for the organic-inorganic composite particles of the present invention.

In the first polymerization step according to the production method of the present invention, the living radical polymerization of the first monomer is conducted in the reaction solution containing the inorganic particles, the first monomer, and the solvent. As a method for the living radical polymerization, a known method can be employed, as appropriate. Examples of the method include the nitroxide-mediated radical polymerization (NMP), the reversible addition-fragmentation chain transfer (RAFT) polymerization, and the atom transfer radical polymerization (ATRP).

In addition, an initiator used for the living radical polymerization is not particularly limited, and examples thereof include azobisisobutyronitrile (AIBN), benzoyl peroxide (BPO), di-tert-butyl peroxide (DBPO), 2,2'-azobis(2,4-dimethylvaleronitrile) (V-65), 2,2'-azobis(4-methoxy-2,4-dimethylvaleronitrile) (V-70), ethyl 2-bromoisobutyrate (EBIB), methyl 2-chloropropionate (MCP), and the like. In addition, a catalyst used for the living radical polymerization is not particularly limited, either, and examples thereof include 2,2,6,6-tetramethylpiperidin-1-oxyl (TEMPO); Cu(I)Cl (stabilized with a ligand); Cu(I)Br (stabilized with a ligand); dithiobenzoates such as cumyl dithiobenzoate (CDB); trithiocarbonates such as benzyl propyl trithiocarbonate; benzyl octadecyl trithiocarbonate; and the like. The concentration of each of the initiator and the catalyst is preferably 0.001 to 100 mM in the reaction solution, although it depends on the types of the initiator and the catalyst.

Although general conditions for the living radical polymerization cannot be specified because the conditions vary depending on the reaction method employed, the inorganic particles, and the first monomer, the conditions are preferably those under which the polymerization of the first monomer is completed. A reaction temperature is preferably 20 to 150° C., and a reaction time is preferably 2 to 48 hours. In addition, appropriate adjustment of these conditions makes it possible to obtain composite particles satisfying the preferred conditions of the number average molecular weight, the molecular weight distribution, the content, and the like of the organic polymer described above for the organic-inorganic composite particles of the present invention.

Moreover, a mass ratio (a mass of the inorganic particles:a mass of the first monomer) between the inorganic particles and the first monomer in the reaction solution is preferably 1:100 to 100:1, and more preferably 1:10 to 10:1. If the ratio of the first monomer is less than the lower limit, the coating ratio of the first polymer on the surfaces of the inorganic particles tends to decrease. Meanwhile, if the ratio of the first monomer exceeds the upper limit, the content ratio of the inorganic particles tends to decrease.

In the first polymerization step according to the production method of the present invention, the living radical polymerization of the first monomer is conducted in the reaction solution. As a result, the obtained first polymer becomes insoluble in or difficult to be miscible with the solvent, and are precipitated and accumulated (adsorbed) on the surfaces of the inorganic particles. This makes it possible to obtain the hydrophilic block (A) in which the first polymer is adsorbed and arranged on the surfaces of the inorganic particles.

In the method for producing organic-inorganic composite particles of the present invention, subsequently, a hydrophobic block (B) made of a second polymer is obtained by adding a second monomer to the reaction solution after the first polymerization step, conducting a living radical polymerization of the second monomer, and polymerizing the second polymer thus obtained onto growing ends of the first polymer, to stack the second polymer on an outside of the hydrophilic block (A) (the second polymerization step).

The second monomer is not particularly limited, as long as a polymer obtained by polymerization of the monomer can be the second polymer satisfying the condition expressed by the above-described formula (2). The monomers listed as the hydrophobic radical-polymerizable monomers for the organic-inorganic composite particles of the present invention can be used preferably. One of these second monomers may be used alone, or two or more thereof may be used in combination. As long as the surface free energy of the obtained polymer satisfies the condition expressed by the above-described formula (2), the hydrophilic radical-polymerizable monomer may be used in combination. Especially, styrene is preferable from the viewpoints that more stable organic-inorganic composite particles tend to be obtained, and the living radical polymerization can be easily conducted. Note that the first monomer and the second monomer according to the present invention only need to be such that the obtained polymers satisfy the condition expressed by the above-described formula (2). For example, it is possible to use hydroxyethyl methacrylate as the first monomer and methyl methacrylate as the second monomer. In addition, the second polymer is the same as described above for the organic-inorganic composite particles of the present invention.

In the second polymerization step according to the production method of the present invention, the living radical polymerization of the second monomer is conducted in the reaction solution after the first polymerization step. The living radical polymerization is the same as described above for the first polymerization step.

In addition, a mass ratio (a mass of the first monomer:a mass of the second monomer) between the first monomer used in the first polymerization step and the second monomer is preferably 1:1 to 1:1,000, and more preferably 1:2 to 1:500. If the ratio of the second monomer is less than the lower limit, the hydrophobicity of the surfaces of the inorganic particles tends to be insufficient. Meanwhile, if the ratio of the second monomer exceeds the upper limit, the organic polymer tends to easily desorb from the surfaces of the inorganic particles.

In the second polymerization step according to the production method of the present invention, the living radical polymerization of the second monomer is conducted in the reaction solution. Since the surface free energy of the obtained second polymer is higher than the surface free energy of the solvent, it is possible to obtain composite particles in each of which a hydrophobic block (B) made of the second polymer is stacked on an outside of the hydrophilic block (A) made of the first polymer. In addition, in the present invention, the adsorption force between the first polymer and the inorganic particles is sufficiently large, and the first polymer and the second polymer are bonded to each other. Hence, even when the solvent is a good solvent for the second polymer, the polymer is not dissolved into the solvent phase, and the hydrophobic block (B) made of the second polymer is stably stacked and arranged on the outside of the hydrophilic block (A) made of the first polymer.

The production method of the present invention preferably further comprises a step of separating, by centrifugation, the inorganic particles coated with the organic polymer from the monomers and the organic polymer not adsorbed onto the inorganic particles, after the first polymerization step and/or the second polymerization step.

Thus, a dispersion can be obtained in which the organic-inorganic composite particles of the present invention comprising the inorganic particles and the organic polymer are dispersed in the solvent. In the present invention, the organic-inorganic composite particles of the present invention can be obtained by recovering the organic-inorganic composite particles from the dispersion by a method such as filtration or centrifugation. In addition, the obtained dispersion as it is may be employed as the dispersion of the present invention, or the dispersion or the resin composition of the present invention may be prepared by re-dispersing the recovered organic-inorganic composite particles in a solvent and/or a resin, as appropriate.

As described above, according to the production method of the present invention, it is possible to obtain the organic-inorganic composite particles of the present invention without conducting a modification treatment for introducing a polymerizable reactive group on the surfaces of the inorganic particles. In addition, according to the production method of the present invention, a large amount of the organic polymer can be sufficiently stably adsorbed onto the inorganic particles, and it is also possible to easily control the particle diameters of the obtained organic-inorganic composite particles by adjusting the particle diameters of the inorganic particles and the degrees of polymerization of the first polymer and the second polymer. In addition, according to the production method of the present invention, the organic-inorganic composite particles of the present invention can be mass-produced (on the order of grams or more, and further on the order of metric tons or more) without any limitation on the type of the inorganic particle.

The organic-inorganic composite particles of the present invention can be used for a wide range of applications according to the type of the inorganic particles. For example, the organic-inorganic composite particles of the present invention can be used for applications of pigments, magnetic materials, and the like in a case where the inorganic particles are made of $Fe_2O_3$; abrasives, catalyst supports, ionic conductors, solid electrolytes, and the like in a case where the inorganic particles are made of $CeO_2$; photocatalysts, high-refractive index materials, pigments, cosmetics, and the like in a case where the inorganic particles are made of $TiO_2$; pigments, catalyst supports, and the like in a case where the inorganic particles are made of $Y_2O_3$; MRI or X-ray multiplexed imaging materials and the like in a case where the inorganic particles are made of $Gd_2O_3$; transparent electric conductors and the like in a case where the inorganic particles are made of $In_2O_3$; fluorescent materials, electroconductive materials, pigments, electronic materials, and the like in a case where the inorganic particles are made of ZnO; electroconductive materials, electric conductors, sensors, and the like in a case where the inorganic particles are made of $SnO_2$; magnetic materials and the like in a case where the inorganic particles are made of $Nb_2O_3$; high-refractive index materials, oxygen storage materials, and the like in a case where the inorganic particles are made of $ZrO_2$; electrodes, catalyst materials, and the like in a case where the inorganic particles are made of Cu, Ag, or Al; electrodes, magnetic materials, catalyst materials, and the like in a case where the inorganic particles are made of Ni; magnetic materials, catalyst materials, and the like in a case where the inorganic particles are made of Co or Fe; electrodes, catalyst materials, and the like in a case where the inorganic particles are made of Ag/Cu; high-temperature materials, high-strength materials, and the like in a case where the inorganic particles are made of AlN or $TiB_2$; and coating materials with high hardness and high corrosion resistance, electroconductive materials, and the like in a case where the inorganic particles are made of TiN.

EXAMPLES

Hereinafter, the present invention will be described more specifically on the basis of Examples and Comparative Examples. However, the present invention is not limited to Examples below. Note that measurements and evaluations were conducted by the following methods in Examples and Comparative Examples.

<Surface Observation>

Particles obtained in each of Examples and Comparative Examples were cast on mica and coated with Pt. Then, the state of the surfaces of the particles was observed by using a scanning electron microscope (SEM, product name: S-4800, manufacturer: Hitachi High-Technologies Corporation). In addition, the diameters of the obtained particles were measured. Note that the maximum diameter of each particle in a cross-section was taken as the diameter, and when the cross-section of the particle was not circular, the diameter of the largest circumscribed circle in the cross-section was taken as the diameter of the particle.

<GPC Measurement>

The polymer not adsorbed on the inorganic particles and recovered by centrifugation from a reaction solution after the reaction in each of Examples and Comparative Examples was eluted by using a gel permeation chromatograph (GPC, product name: Alliance 2695 system, manufacturer: WATERS) under the following conditions: Columns: guard column KF-G, KF-803 L with an exclusion limit of $7 \times 10^4$ D, and KF-805 L with an exclusion limit of $4 \times 10^6$ D (D: dalton (a unit having the same dimension as g mol$^{-1}$)), which were manufactured by Shodex; Detector: refractive index detector (RI); Mobile phase: tetrahydrofuran (THF); Elution rate: 1 mL/min; and Column temperature: 35° C. In addition, calibration was conducted by using a PS standard sample (Polymer Standard Service, PSS-Kit(PS), $M_p$. (peak top molecular weight): 682-1.67×10$^6$ D) and a PMMA standard sample (PSS-Kit (PMMA), $M_p$.: 102-9.81×10$^5$ D), and the number average molecular weight (Mn [g/mol]), the weight average molecular weight (Mw [g/mol]), and the molecular weight distribution (Mw/Mn) of each polymer were calculated. Note that the obtained Mn, Mw, and Mw/Mn were assumed to be equivalent to the Mn, Mw, and Mw/Mn of the polymer adsorbed on the inorganic particles, respectively.

<Thermogravimetric Measurement>

For the particles obtained in each of Examples and Comparative Examples, the change in mass (weight) of the particles from 100 to 750° C. was measured by using a thermogravimetric (TG) analyzer (product name: TG8120, manufacturer: Rigaku Corporation), while argon gas was supplied at 30 mL/min. Thus, the content ratio (% by mass) of the polymer in the obtained particles was measured.

In addition, from a primary particle diameter (volume average particle diameter) of the inorganic particles used in each of Examples and Comparative Examples, the Mn and Mw of the polymer obtained by the GPC measurement, and the content ratio of the polymer, the number of molecules (the number of chains) (chains/NP (in terms of polystyrene)) of the polymer adsorbed per inorganic particle, and the number of molecules (the number of chains) (chains/nm$^2$) of the polymer per unit surface area of the inorganic particles were determined.

<Dispersibility Evaluation>

A 20% by mass dispersion of the particles obtained in each of Examples and Comparative Examples in toluene was prepared, and this dispersion was allowed to stand at 20° C. for 1 hour. Then, the dispersibility was visually observed and evaluated by using the following criteria:

A: The dispersibility was good, and no precipitates were observed.

B: Precipitates were observed, and the dispersion was almost separated into a supernatant and the precipitates.

C: Precipitates were formed immediately after the preparation of the dispersion (within 5 minutes), and the dispersion was separated into a supernatant and the precipitates.

<Particle Size Distribution Measurement>

A 0.01% by mass dispersion of the particles obtained in each of Examples and Comparative Examples in toluene was prepared, and the dispersoid diameter of the dispersoids in the solvent was measured at 25° C. by dynamic light scattering (DLS) using Zetasizer Nano ZS (manufactured by Malvern), and the average value of three measurements was plotted, and the particle size distribution (volume distribution) was obtained. In addition, the particle size distribution was obtained for inorganic particles used as the raw material in the same manner. Note that a smaller dispersoid diameter indicates a better dispersibility.

Example 1 NMP

First, in an argon-filled glovebox, a toluene solution was prepared in which 25.6 mM of 2,2,6,6-tetramethylpiperidin-1-oxyl (TEMPO), 3.04 mM of azobisisobutyronitrile (AIBN), and 1 g of ethyl acrylate (EA, water droplet contact angle on polyethyl acrylate: 62°, surface free energy (at 20° C., hereinafter the same): 36.5 mN/m) were added to 1 mL of toluene (surface free energy: 28.5 mN/m), and was stored in a freezer (−35° C.). Subsequently, in the same glovebox, 0.5 g of inorganic particles (α-Al$_2$O$_3$, primary particle diameters: 40 to 80 nm, volume average particle diameter (APS): 60 nm, water droplet contact angle: 63°, surface free energy: 45 mN/m or higher, manufactured by NanoAmor), and 2 mL of the toluene solution were introduced into a test tube with a screw cap and stirred to prepare a reaction solution. Then, this reaction solution was set to an aluminum block heater heated to 120° C. in advance to start the polymerization. Twelve hours after the start of the polymerization, 2 g of styrene (ST, water droplet contact angle on polystyrene: 84°, surface free energy: 34.5 mN/m) was added to the reaction solution, and the reaction was further allowed to proceed for 24 hours. Then, the reaction solution was taken out of the heater and the glovebox, and the polymerization was completely stopped by adding chloroform which was made rich in oxygen in advance. Subsequently, an operation in which the reaction solution after the reaction was centrifuged at 15,000 rpm for 30 minutes and the supernatant was removed was repeated three times. Thus, the polymer not adsorbed on the inorganic particles was obtained in the removed supernatant, and particles in which the polymer was adsorbed on the inorganic particles were obtained as the precipitates.

Examples 2 to 15

In each of Examples 2 to 15, a polymer not adsorbed on inorganic particles and particles in which the polymer was adsorbed on the inorganic particles were obtained in the same manner as in Example 1, except that the composition of the inorganic particles, ethyl acrylate, and styrene shown in Table 1 was employed.

Examples 16 to 18 NMP

In each of Examples 16 to 18, a polymer not adsorbed on inorganic particles and particles in which the polymer was adsorbed on the inorganic particles were obtained in the same manner as in Example 1, except that 0.5 g of 2-hydroxyethyl acrylate (HEA, water droplet contact angle on poly(2-hydroxyethyl acrylate): 48°, surface free energy: 37.8 mN/m) was used instead of ethyl acrylate, and that the composition of the inorganic particles shown in Table 1 was employed.

Example 19 ATRP

First, in an argon-filled glovebox, a dichloromethane solution was prepared in which 71 mM of ethyl 2-bromoisobutyrate (EBIB), 141 mM of Cu(I)Cl, 290 mM of 4,4'-dinonyl-2,2'-dipyridyl (dNbpy), and 0.5 g of 2-hydroxyethyl methacrylate (HEMA, surface free energy of poly(2-hydroxyethyl methacrylate): 37.1 mN/m) were added to 2 mL of dichloromethane (surface free energy: 28.9 mN/m), and the dichloromethane solution was stored in a freezer (−35° C.). Subsequently, in the same glovebox, 1 g of inorganic particles ($\alpha$-$Al_2O_3$, primary particle diameters: 40 to 80 nm, volume average particle diameter (APS): 60 nm, water droplet contact angle: 63°, surface free energy: 45 mN/m or higher, manufactured by NanoAmor), and 2 mL of the above-described dichloromethane solution were added to a test tube with a screw cap, and stirred to prepare a reaction solution. Then, the reaction solution was set to an aluminum block heater heated to 50° C. in advance to start the polymerization. Twelve hours after the start of the polymerization, 1.5 g of methyl methacrylate (MMA, surface free energy of polymethyl methacrylate: 34.5 mN/m) was added to the reaction solution, and the reaction was further allowed to proceed for 24 hours. Then, the reaction solution was taken out of the heater and the glovebox, the polymerization was completely stopped by adding chloroform which was made rich in oxygen in advance. Subsequently, an operation in which the reaction solution after the reaction was centrifuged at 15,000 rpm for 30 minutes and the supernatant was removed was repeated three times. Thus, the polymer not adsorbed on the inorganic particles was obtained in the removed supernatant, and particles in which the polymer was adsorbed on the inorganic particles were obtained as the precipitates.

Examples 20 and 21

In each of Examples 20 and 21, a polymer not adsorbed on inorganic particles and particles in which the polymer was adsorbed on the inorganic particles were obtained in the same manner as in Example 19, except that the composition of the inorganic particles, 2-hydroxyethyl methacrylate, and methyl methacrylate shown in Table 1 was employed.

Example 22 RAFT

First, in an argon-filled glovebox, a chloroform solution was prepared in which 7.8 mM of benzyl octadecyl trithiocarbonate, 1.5 mM of 2,2'-azobis(2,4-dimethylvaleronitrile) (V-65), and 1 g of 2-hydroxyethyl acrylate (HEA, surface free energy of poly(2-hydroxyethyl acrylate):37.8 mN/m) were added to 2 mL of chloroform (surface free energy: 27.1 mN/m), and the chloroform solution was stored in a freezer (−35° C.). Subsequently, in the same glovebox, 1 g of inorganic particles ($\alpha$-$Al_2O_3$, primary particle diameters: 40 to 80 nm, volume average particle diameter (APS): 60 nm, water droplet contact angle: 63°, surface free energy: 45 mN/m or higher, manufactured by NanoAmor), and 2 mL of the chloroform solution were added to a test tube with a screw cap, and stirred to prepare a reaction solution. Then, the reaction solution was set to an aluminum block heater heated to 50° C. in advance to start the polymerization. Twelve hours after the start of the polymerization, 3 g of styrene (ST, water droplet contact angle on polystyrene: 84°, surface free energy: 34.5 mN/m) was added to the reaction solution, and the reaction was further allowed to proceed for 24 hours. Then, the reaction solution was taken out of the heater and the glovebox, and the polymerization was completely stopped by adding toluene which was made rich in oxygen in advance. Subsequently, an operation in which the reaction solution after the reaction was centrifuged at 15,000 rpm for 30 minutes and the supernatant was removed was repeated three times. Thus, the polymer not adsorbed on the inorganic particles was obtained in the removed supernatant, and particles in which the polymer was adsorbed on the inorganic particles were obtained as the precipitates.

Comparative Example 1

The inorganic particle used in Example 1 were used, as they were, for the measurements and evaluations.

Comparative Example 2

The inorganic particle used in Example 3 were used, as they were, for the measurements and evaluations.

Comparative Example 3

First, inorganic particles ($\alpha$-$Al_2O_3$, primary particle diameters: 40 to 80 nm, volume average particle diameter (APS): 60 nm, manufactured by NanoAmor) were spread in a small thickness on a glass Petri dish. Then, the Petri dish was placed in a plasma etcher (product name: SEDE, manufacturer: MEIWAFOSIS CO., LTD), and a plasma treatment was conducted for 15 minutes. Subsequently, in an argon-filled glovebox, a styrene solution containing 9.6 mM of 2,2,6,6-tetramethylpiperidin-1-oxyl (TEMPO) was prepared, and stored in a freezer (−35° C.). Subsequently, in the same glovebox, 0.5 g of the plasma-treated inorganic particles and 3 g of the styrene solution were added to a test tube with a screw cap, and stirred to prepare a reaction solution. This reaction solution was set to an aluminum block heater heated to 125° C. in advance to start the polymerization. Twelve hours after the start of the polymerization, the reaction solution was taken out of the heater and the glovebox, and the polymerization was completely stopped by adding chloroform which was made rich in oxygen in advance. Subsequently, an operation in which the reaction solution after the reaction was centrifuged at 15,000 rpm for 30 minutes and the supernatant was removed was repeated three times. Thus, particles in which the polymer was adsorbed on the inorganic particles were obtained as the precipitates, respectively.

The particles obtained in each of Examples and Comparative Examples were subjected to the surface observation. FIG. 2A to FIG. 5 show SEM photographs of Examples 1 and 3 and Comparative Examples 1 and 2. As is apparent from the results shown in FIGS. 2A, 2B, and 4, it was found that each of the particles obtained by the production method of the present invention had a smooth surface, and the surface of the inorganic particle was coated with the organic polymer. In addition, the particle diameters of the particles obtained in Example 1 were in a range from 40 to 80 nm, and the particle diameters of the particles obtained in Example 3 were in a range from 15 to 35 nm.

Figure 6:
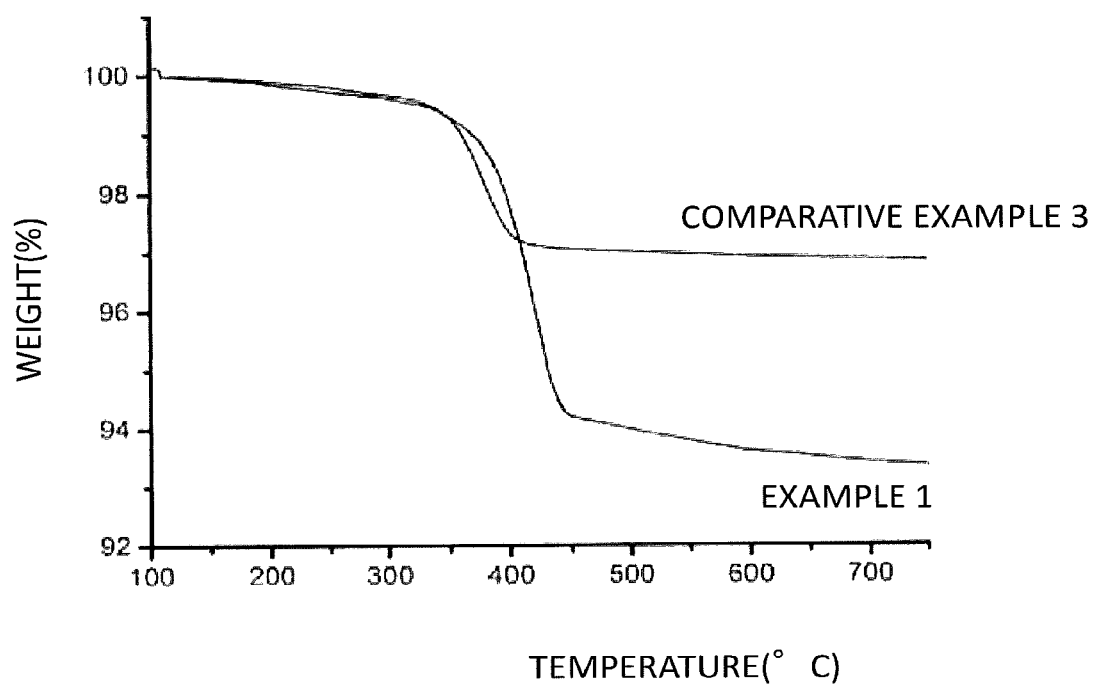
FIG. 6 is a graph showing results of thermogravimetric measurement of particles obtained in Example 1 and Comparative Example 3.

In addition, the polymer not adsorbed on the inorganic particles and the particles obtained in each of Examples and Comparative Examples were subjected to the GPC measurement and the thermogravimetric measurement. Table 1 shows the Mn (g/mol) and the Mw/Mn of the polymer adsorbed on the inorganic particles and the number of molecules of the polymer adsorbed per inorganic particle (chains/NP (in terms of polystyrene)) in the particles obtained in each of Examples 1 to 16, together with the composition of the particles. In addition, FIG. 6 shows the thermogravimetric measurement results of the particles obtained in Example 1 and Comparative Example 3. Note that, regarding the thermogravimetric measurement, the particles obtained in Example 1 were not subjected to any fractionation operation, whereas the particles obtained in Comparative Example 3 were fractionated to obtain particles which seemed to having many grafted chains in the polymer (particles with high dispersibility), and these particles were used for the measurement.

In addition, as the particle diameters of the inorganic particle, Table 1 shows the range of the particle diameters and the volume average particle diameter (APS) determined particles in the dispersion obtained in each of Examples were sufficiently dispersed. Especially, although γ-$Fe_2O_3$ used as the inorganic particles in Example 6 had the magnetic nature, the dispersibility of the particles of Example 6 was better than that of the inorganic particles not coated with the organic polymer.

Figure 9:
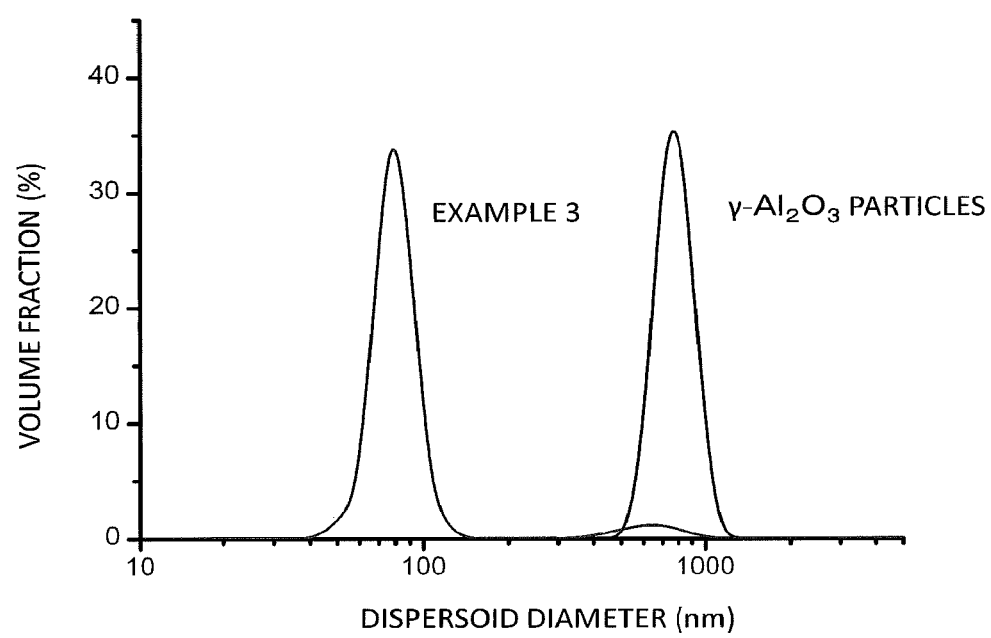
FIG. 9 is a graph showing particle size distributions of the particles obtained in Example 3 and inorganic particles (γ-$Al_2O_3$) used in Example 3.

In addition, FIG. 9 shows the particle size distributions obtained by measuring the diameters of the dispersoids in the dispersions of the particles obtained in Example 3 and the inorganic particles (γ-$Al_2O_3$, primary particle diameter (volume average particle diameter (APS)):25 nm) used in Example 3. As is apparent from the results shown in FIG. 9, the inorganic particles (alumina particles) coated with the organic polymer exhibited good dispersibility.

TABLE 1

| | Inorganic particles | | | | Polymer | | | | |
| | Constitution (Manufacturer) | Range of particle diameter [nm] | Volume average particle diameter [nm] | Amount used [g] | Monomer | | Mn [g/mol] | Mw/Mn | Number of molecules [chains/NP] | Stability evaluation |
| | | | | | First [g] | Second [g] | | | | |
|---|---|---|---|---|---|---|---|---|---|---|
| Example 1 | α-Al2O3 (NanoAmor) | 40-80 | 60 | 0.5 | EA: 1 | ST: 2 | 78,000 | 1.63 | 222 | A |
| Example 2 | α-Al2O3 (NanoAmor) | 30-40 | 35 | 0.5 | EA: 1 | ST: 2 | 70,000 | 1.49 | 57 | A |
| Example 3 | γ-Al2O3 (NanoAmor) | — | 25 | 0.5 | EA: 1 | ST: 2 | 20,000 | 1.46 | 300 | A |
| Example 4 | γ-Al2O3 (NanoAmor) | — | 25 | 0.2 | EA: 1 | ST: 2 | 47,000 | 1.4 | — | A |
| Example 5 | Co3O4 (NanoAmor) | 10-30 | — | 0.5 | EA: 1 | ST: 2 | 60,000 | 1.47 | — | A |
| Example 6 | γ-Fe2O3 (NanoAmor) | 20-40 | — | 0.3 | EA: 1 | ST: 2 | 49,000 | 1.32 | — | B |
| Example 7 | In2O3 (NanoAmor) | 30-50 | — | 0.6 | EA: 1 | ST: 2 | 61,000 | 1.7 | — | B |
| Example 8 | SiOX (NanoAmor) | — | 15 | 0.5 | EA: 1 | ST: 2 | 48,000 | 1.32 | — | A |
| Example 9 | TiO2(A) (NanoAmor) | — | 5 | 0.2 | EA: 1 | ST: 2 | 49,000 | 1.27 | — | A |
| Example 10 | Y2O3 (NanoAmor) | 20-40 | — | 0.2 | EA: 1 | ST: 2 | 47,000 | 1.21 | — | A |
| Example 11 | ZnO (NanoAmor) | — | 20 | 0.5 | EA: 1 | ST: 2 | 71,000 | 1.54 | — | A |
| Example 12 | ZrO2 (NanoAmor) | — | 20 | 0.5 | EA: 1 | ST: 2 | 70,000 | 1.63 | — | A |
| Example 13 | BaTiO3 (NanoAmor) | — | 100 | 0.5 | EA: 1 | ST: 2 | 67,000 | 1.38 | — | A |
| Example 14 | AlN (NanoAmor) | 10-20 | — | 0.2 | EA: 1 | ST: 2 | 65,000 | 1.36 | 18 | A |
| Example 15 | TiN (NanoAmor) | — | 20 | 0.2 | EA: 1 | ST: 2 | 66,000 | 1.34 | 10 | A |
| Example 16 | α-Al2O3 (NanoAmor) | 40-80 | 60 | 1 | HEA: 0.5 | ST: 2 | 47,000 | 1.4 | — | A |
| Example 17 | SiOX (NanoAmor) | — | 15 | 0.5 | HEA: 0.5 | ST: 2 | 46,000 | 1.31 | — | A |
| Example 18 | γ-Al2O3 (NanoAmor) | — | 25 | 0.5 | HEA: 0.5 | ST: 2 | 32,000 | 1.37 | — | A |
| Example 19 | α-Al2O3 (NanoAmor) | 40-80 | 60 | 1 | HEMA: 0.5 | MMA: 1.5 | 54,000 | 1.9 | — | A |
| Example 20 | γ-Al2O3 (NanoAmor) | — | 25 | 0.3 | HEMA: 0.5 | MMA: 1.5 | 81,000 | 2.09 | — | A |
| Example 21 | SiOX (NanoAmor) | — | 15 | 0.2 | HEMA: 0.5 | MMA: 1.5 | 38,000 | 1.54 | 61 | A |
| Example 22 | α-Al2O3 (NanoAmor) | 40-80 | 60 | 1 | HEA: 1 | ST: 3 | 53,000 | 1.72 | 899 | A |
| Comp. Ex. 1 | α-Al2O3 (NanoAmor) | 40-80 | 60 | 0.5 | — | — | — | — | — | C | by the gas adsorption method. In addition, each of the surface free energies of the inorganic particles was 45 mN/m or higher.

The GPC measurement and the thermogravimetric measurement showed that the contents of the organic polymer per unit surface area of the inorganic particles in terms of number of molecules (number of chains) were 0.0196 chains/$nm^2$ and 0.153 chains/$nm^2$ in Examples 1 and 3, respectively. In addition, the thermogravimetric measurement showed that the content ratio of the organic polymer in the obtained particles was 2.5% by mass in Comparative Example 3, whereas the content ratio was 6% by mass in Example 1, and 17% by mass in Example 3.

Figure 7:
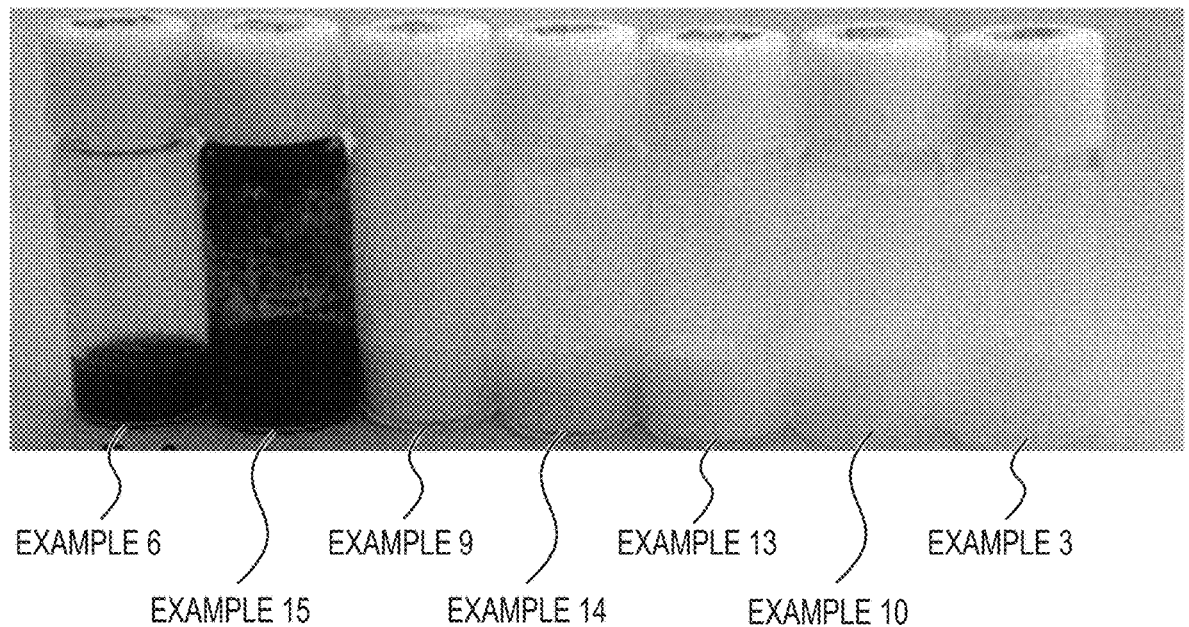
FIG. 7 is a photograph showing the appearances of dispersions of particles obtained in Examples 3, 6, 9, 10, and 13 to 15.
Figure 8:
FIG. 8 is a photograph showing the appearance of a dispersion of particles obtained in Example 17.

In addition, Table 1 also shows the results of the dispersibility evaluation conducted on the particles obtained in each of Examples and Comparative Examples. Moreover, FIGS. 7 and 8 show photographs showing the states of dispersions of the particles obtained in Examples 3, 6, 9, 10, 13 to 15, and 17 which had been allowed to stand for 1 hour. Note that the concentration of the dispersion of the particles obtained in Example 17 shown in FIG. 8 was 50% by mass. The As is apparent from the results shown in Table 1, FIG. 2A, FIG. 2B, and FIG. 4, it has been found that the production method of the present invention makes it possible to uniformly cover the surfaces of many types of inorganic particles with an organic polymer, without conducting a modification treatment for introducing a polymerizable reactive group on the surfaces of the inorganic particles, and also makes it possible to obtain a large amount of organic-inorganic composite particles having a sufficiently high content ratio of the organic polymer. Note that it has been found that 5 g or more of organic-inorganic composite particles can be obtained at once by the production method of the present invention, for example, by the same method as in Example 1. In addition, as is apparent from the results shown in Table 1 and FIGS. 7 and 8, it has been found that the organic-inorganic composite particles of the present invention are sufficiently stable, and have excellent dispersibility.

INDUSTRIAL APPLICABILITY

As described above, according to the present invention, it is possible to provide organic-inorganic composite particles having an excellent dispersibility in a solvent, a dispersion comprising the organic-inorganic composite particles, and a resin composition comprising the organic-inorganic composite particles, as well as a method for producing organic-inorganic composite particles which enables the organic-inorganic composite particles to be easily obtained in a large amount without conducting a modification treatment for introducing a polymerizable reactive group on the surfaces of inorganic particles.

REFERENCE SIGNS LIST

1: polymerization initiator
2: first monomer
3: first polymer
4: second monomer
5: second polymer

The invention claimed is:

1. A method for producing organic-inorganic composite particles comprising inorganic particles and an organic polymer, the method comprising:
   a first polymerization step of obtaining a hydrophilic block made of a first polymer by conducting a living radical polymerization of a first monomer in a reaction solution containing the inorganic particles, the first monomer, and a solvent, without conducting a modification treatment for introducing a polymerizable reactive group on surfaces of the inorganic particles, and allowing the first polymer thus obtained to be adsorbed on the surfaces of the inorganic particles; and
   a second polymerization step of obtaining a hydrophobic block made of a second polymer by adding a second monomer to the reaction solution after the first polymerization step, conducting a living radical polymerization of the second monomer, and polymerizing the second polymer thus obtained onto growing ends of the first polymer, to stack the second polymer on an outside of the hydrophilic block,
   wherein the inorganic particles, the first polymer, the second polymer, and the solvent have surface free energies satisfying a condition expressed by the following formula (2):

$$E_{NP} > E_A > E_B > E_S \quad (2)$$

where:
   $E_{NP}$ represents the surface free energy of the inorganic particles,
   $E_A$ represents the surface free energy of the first polymer,
   $E_B$ represents the surface free energy of the second polymer, and
   $E_S$ represents the surface free energy of the solvent.

2. The method for producing organic-inorganic composite particles according to claim 1, wherein:
   the organic polymer comprises the hydrophilic block that is arranged on the surfaces of the inorganic particles and the hydrophobic block that extends from the hydrophilic block, and
   a content of the organic polymer per unit surface area of the inorganic particles is in a range of from 0.0005 to 1.0 chains/nm$^2$ as obtained and calculated by Gel Permeation Chromatograph (GPC) measurement and thermogravimetric measurement.

3. The method for producing organic-inorganic composite particles according to claim 1, wherein a ratio of a mass of the first polymer to a mass of the second polymer is in a range of from 1:1 to 1:500.

4. The method for producing organic-inorganic composite particles according to claim 1, wherein:
   the organic polymer comprises the hydrophilic block that is arranged on the surfaces of the inorganic particles and the hydrophobic block that extends from the hydrophilic block, and
   the organic polymer has a number average molecular weight in a range of from 3,000 to 1,000,000 g/mol, and a molecular weight distribution (weight average molecular weight/number average molecular weight) in a range of from 1.05 to 2.0.

5. The method for producing organic-inorganic composite particles according to claim 1, wherein the organic-inorganic composite particles have particle diameters in a range of from 1.6 to 10,000 nm.

6. A method for producing a dispersion, the method comprising:
   after the method for producing organic-inorganic composite particles according to claim 1, re-dispersing the obtained organic-inorganic composite particles in a solvent.

7. A method for producing a resin composition, the method comprising:
   after the method for producing organic-inorganic composite particles according to claim 1, re-dispersing the obtained organic-inorganic composite particles in a resin.

* * * * *